United States Patent
Xie et al.

(10) Patent No.: US 7,589,882 B2
(45) Date of Patent: Sep. 15, 2009

(54) OPTICAL TRANSCEIVER INTEGRATABLE WITH SILICON VLSI

(75) Inventors: Ya-Hong Xie, Beverly Hills, CA (US); Bin Shi, Hong Kong Island (HK)

(73) Assignee: The Regents of the University of California

( * ) Notice: Subject to any disclaimer, the term of this patent is extended or adjusted under 35 U.S.C. 154(b) by 0 days.

(21) Appl. No.: 11/871,024

(22) Filed: Oct. 11, 2007

(65) Prior Publication Data

US 2008/0085120 A1     Apr. 10, 2008

Related U.S. Application Data

(63) Continuation of application No. PCT/US2006/014578, filed on Apr. 18, 2006.

(60) Provisional application No. 60/672,911, filed on Apr. 18, 2005.

(51) Int. Cl.
G02F 1/03     (2006.01)

(52) U.S. Cl. .................. 359/247; 359/248; 359/263; 359/318

(58) Field of Classification Search .................. 359/247, 359/248, 263, 317, 318, 344
See application file for complete search history.

(56) References Cited

U.S. PATENT DOCUMENTS

| | | | | |
|---|---|---|---|---|
| 5,495,360 | A | * | 2/1996 | Yoo .......................... 359/248 |
| 5,909,303 | A | * | 6/1999 | Trezza et al. ................ 359/248 |
| 6,005,707 | A | * | 12/1999 | Berggren et al. ............ 359/322 |

* cited by examiner

Primary Examiner—Joseph Martinez
(74) Attorney, Agent, or Firm—John P. O'Banion

(57) ABSTRACT

A modulator for an optical transceiver is disclosed. The modulator has two quarter-wave stack mirrors composed of alternating dielectric layers with an optically absorbing layer sandwiched in between to form the vertical resonant cavity. The optically absorbing layer is made of semiconductor nanocrystals embedded in a dialectic material. The device is configured to operate near the saturation point of the absorption layer. By adjusting the biasing voltage across the absorption layer, the saturation threshold of the semiconductor nanocrystals is altered, resulting in the overall reflectivity of the resonant cavity to vary. The modulator is configured to be fabricated as the extension of the backend process of Si CMOS.

34 Claims, 6 Drawing Sheets

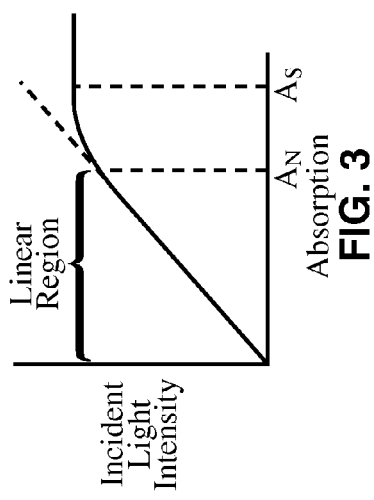
FIG. 3
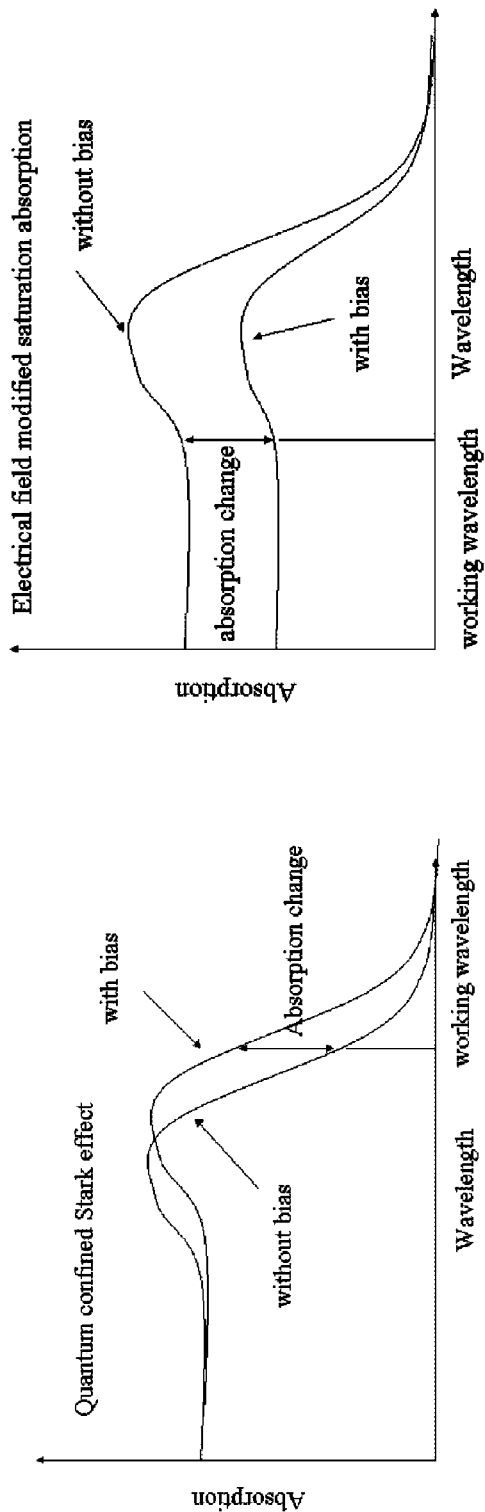
FIG. 4A
(Prior Art)
FIG. 4B

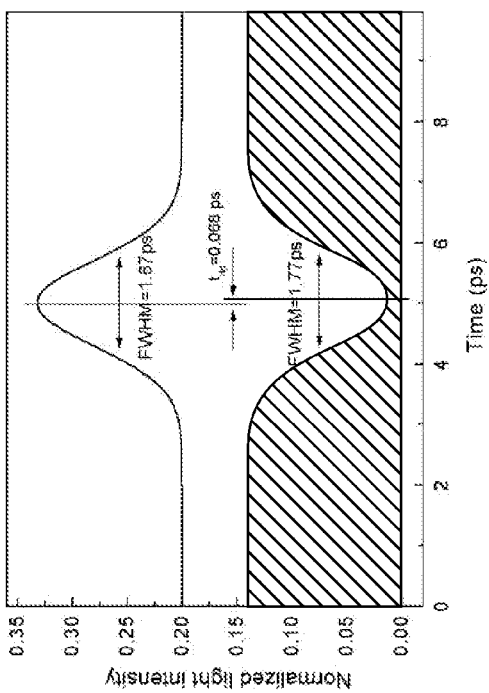
FIG. 7
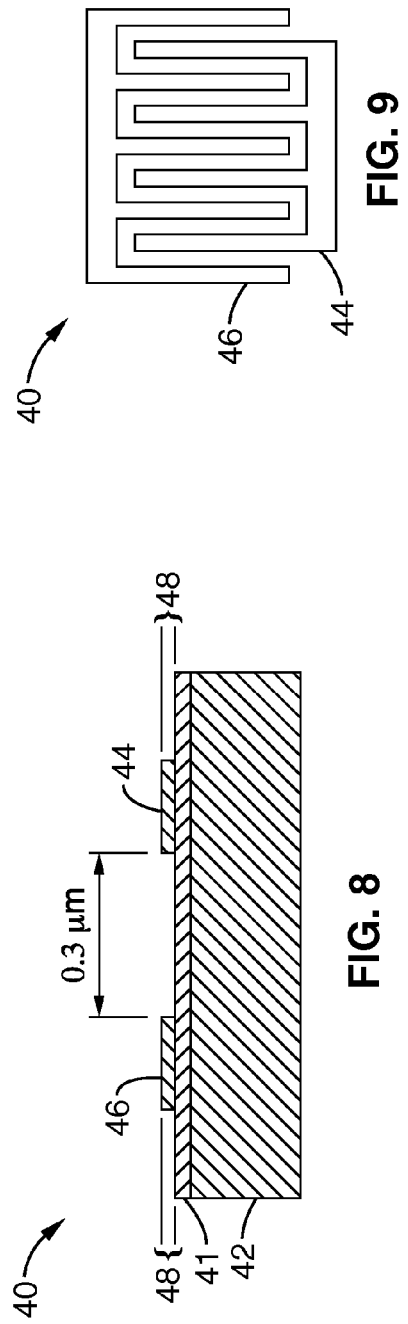
FIG. 9
FIG. 8

OPTICAL TRANSCEIVER INTEGRATABLE WITH SILICON VLSI

CROSS-REFERENCE TO RELATED APPLICATIONS

This application claims priority from, and is a 35 U.S.C. § 111(a) continuation of, co-pending PCT international application serial number PCT/US2006/014578, filed on Apr. 18, 2006, incorporated herein by reference in its entirety, which claims priority from U.S. provisional application Ser. No. 60/672,911 filed on Apr. 18, 2005, incorporated herein by reference in its entirety.

This application is also related to PCT International Patent Publication No. WO2006/113725 A2, published Oct. 26, 2006, and No. WO2006/113725 A3, published Mar. 1, 2007, each of which is incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

A portion of the material in this patent document is also subject to protection under the maskwork registration laws of the United States and of other countries. The owner of the maskwork rights has no objection to the facsimile reproduction by anyone of the patent document or the patent disclosure, as it appears in the United States Patent and Trademark Office publicly available file or records, but otherwise reserves all maskwork rights whatsoever. The maskwork owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to an optical transceiver for easy integration with silicon chips, and more particularly to an electro-optical modulator.

2. Description of Related Art

The rapid advancement of the state-of-the-art silicon integrated circuit (Si IC) technology continuously brings new challenges. One of the major technological challenges facing the industry today is high data rate (or for analog applications, high bandwidth) communication between chips. As the data rate increases to above Gbps, the ability of maintaining the data integrity using electrical interconnects becomes a very challenging issue.

The majority of interconnect systems can be divided into two large categories: those that are dominated by LC delays and those that are dominated by RC delays. The differentiation is whether the impedance from the inductance of interconnects dominates over the resistance. Because the former increases with the bit-rate of the signal, there is a crossover frequency at which a RC system becomes a LC one. It is well known that high speed interconnects are subject to the trade off between distance and bit rate. For a discernable signal at the receiving end, the longer the wires the lower the bit rate they can carry. Although the physics governing the signal delay in a LC system is fundamentally different from that for a RC system, the ultimate bit-rate limits appear to have a nearly identical form:

$$B \approx B_0 \frac{A}{l^2}$$

where A and l represent the cross-section area and the length of the interconnect, respectively, and the constant $B_0$ is on the order of $10^{15}$ bps for optimized chip-to-chip interconnects. In other words, it is the aspect ratio, instead of the length, of interconnects that dictates the maximum achievable bit-rate. For typical interconnect length of 2 cm and use a skin depth limited wire diameter of 10 µm, the maximum bit-rate is lower than 1 GHz. According to the International Technology Roadmap for Semiconductors (ITRS), the off-chip speed will be around 10 GHz with typical interconnect length of 2 cm by year 2010. Even after factoring in the possibility of using larger but practical diameter wires, electrical interconnects post a severe limit in this regard. Optical interconnects, on the other hand, are not subject to this set of limiting physics. As a result, optical interconnects can out perform the electrical counterpart by multiple orders of magnitude. For example, a sophisticated optical system can handle the transmission of 160 Gbps over 232 km of optical fiber. It is quite obvious that optical is the way of the future of chip-to-chip interconnects.

Unfortunately, the various optical interconnects suffer from higher than ideal "overhead". The "overhead" includes added power consumption and the associated heat dissipation if an on-chip laser is used, the complexity of added circuit elements to drive light sources, and the need for the integration of compound semiconductor materials on Si substrates. The high "overhead" translates directly into cost in production. Additional problems that are inherent to high data rate communications include the latency and skew in propagation delay.

Optical chip-to-chip interconnects have been contemplated. The demand comes from the need to maintain signal integrity while allowing for sufficient information flow to fully utilize the power provided by the increasingly dense CMOS.

The various approaches can be roughly divided into two large families: those employ active light emitters on Si, and those that rely on passive modulators. On the detector side, special measures are needed if the popular 1.3-1.5 µm wavelength is used. SiGe photodetectors have been intensively studied for this reason.

In recent years, it has become evident that for optical chip-to-chip interconnects to actually benefit IC industry, reducing the overhead associated with incorporating and operating the optical elements is of primary importance. In that regard, power consumption is a significant factor because high performance Si chips are already operating at near 100° C. with a cooling fan. Because the thermal management of IC alone is so challenging, any notion of adding a heat-generating device to is a hard sell.

A transmitter, in many senses, is a more challenging device to incorporate into Si than is the receiver. Several demonstrations of compound semiconductor lasers attached to Si chips via either wafer bonding or by flip-chip bonding have been made in the past few years. These approaches all face the severe challenge of the "overhead" issue mentioned above. In addition to the large thermal load associated with lasers, there is the need for high-speed driver circuits that are capable of operating at high frequencies while delivering sizeable current drive. Such simultaneous requirement makes the driver circuit itself the most challenging circuit element of any technology generation despite of the fact that it is functionally a support element to the processors.

With regard to the wavelength of the light, the customary choice of IR makes it difficult to obtain detectors with large enough bandwidth. This comes as a direct consequence of the large absorption length of silicon at these wavelengths. A fast detector can only be obtained at a severe sacrifice of the detectivity.

The above drawbacks generally summarize the reasons why the active approach to optical interconnect has not yet shown to be successful. On the other hand, the effort based on passive devices is affected by available modulators. Conventional modulators based on electro-optical materials such as LiNbO (see R. G. Batchko, M. M. Fejer, and L. Erman, Opt. Lett., 24, 1293 (1999)), SrBaNbO (see O. Kwon, O. Eknoyan, H. F. Taylor and R. R. Neurgaonkar, Electron. Lett., 35, 219 (1999)), and more recently polymeric materials (see D. G. Sun and R. T. Chen, Appl. Phys. Lett., 72, 3139 (1998)), have serious limitations.

For LiNbO and SrBaNbO modulators, there is an inherent trade-off between the modulator length (L) and the applied voltage for 180-phase shift ($V_\pi$). Typical value of $V_\pi \cdot L$ ranges from a few volts-cm to 0.25 V-cm with a modulation depth of 95%-99%. As a result, the modulators require either a waveguided structure of centimeter length, or a modulation voltage much higher than the typical supply voltage of approximately 1 volt on-chip. The waveguide geometry of centimeter lengths makes them incompatible with dense 2-dimensional modulator arrays as may be required by future Si technology. Most of these features are also applicable to polymer modulators. The weak electro-optical coefficient of the currently known polymer materials leads to a much higher $V_\pi \cdot L$ value. Another issue with conventional modulators is the need for high voltage poling after the film is deposited (typically by sputtering) onto the substrate. Such high voltage process may subject the underlying Si circuit to electrostatic damage.

III-V quantum-well modulators based on quantum-confined Stark effect (e.g. those shown in D. A. B. Miller, D. S. Chemla, T. C. Damen, A. C. Gossard, W. Wiegmann, T. H. Wood, and C. A. Burrus, Phys. Rev. Lett., 53, 2173 (1984)) have so far been the devices most extensively used in demonstrating dense optical interconnects between chips. But the technology of integration of III-V devices with silicon is always difficult and costly. Unfortunately, this family of structures requires hetero-epitaxial integration of compound semiconductors with Si, i.e. the entire vertical cavity will have to be epitaxial on Si. Such a structure is prohibited by the tremendous strain energy in that it inevitably leads to dislocation. Probably the most feasible approach of realizing such a structure is through bonding of the vertical cavity together with the electro-absorption layer onto Si substrates. Such an approach is incompatible with state-of-the-art CMOS and is yet to be proven as a manufacturable technology.

Therefore, it would be desirable to enhance the functionality of Si CMOS ICs with a high bandwidth optical chip-to-chip interconnect.

It would also be desirable to provide a modulator which can be easily fabricated on variable substrate and be compatible with current CMOS processing It would further be desirable to provide a modulator which can be incorporated into the backend processing of conventional Si CMOS.

BRIEF SUMMARY OF THE INVENTION

An electro-absorption (EA) modulator based on a photonic band gap (PBG) structure is disclosed. A multilayer stack of alternating low index and high index of refraction dielectric layers are formed on the top of a conductive layer, serve as one-dimensional (1-D) PBG. A layer of electro-absorption material layer sandwiched between two multilayer stacks forms an optical cavity. An electrode (e.g. iridium-tin oxide (ITO)) is deposited on the top of the structure as the top electrode, and the conductive layer as the bottom electrode. An off-chip laser, e.g. a commercially available DVD laser, can be used as the light source. The light from the laser incident onto the modulator results in a build up of the optical field inside the cavity to a level orders of magnitudes higher than that of the laser light in free space. The electro-absorbing layer consists of semiconductor nanostructures such as quantum dots (QDs), e.g. CdSe or CdTe, absorbs the light. At high light intensity such as that inside the optical cavity, the ability of the QDs in absorbing the light decreases. This is known as absorption saturation. The overall reflected light intensity from the modulator is inversely proportional to the absorption of the QDs. The specific light intensity at which a particular type of QDs begin to saturate is dependent on the external bias electric field, and in general decreases with increasing electric field. Hence, the reflectance of light of frequency at resonant mode can be modulated by the applied bias.

Since the modulator of the present invention is based on field effect as opposed to current injection, it allows for low power operation and eliminates the need for high current drive in a high-speed driver circuitry, greatly reducing that part of the "overhead".

The present invention includes a novel approach for achieving a low overhead optical transceivers that fully integratable with Si CMOS (back end) technology. A preferred application is for high bandwidth chip-to-chip interconnects, and as optical modems for local area networks (LAN). A general requirement on the wavelength of operation is that the photon energy is preferably larger than the Si energy bandgap, and therefore a Si diode can be used as the photodetector. In other words, the preferred wavelengths for longer distance communications near 1.3 µm or 1.55 µm are not necessary and may be traded off for being able to use Si photodetectors or photodiodes. For example, a wavelength of 635 nm may be chosen, for which commercially available DVD lasers can be used as the light source. Coincidentally, detectivity of Si photodiodes peak near that wavelength.

The modulator structure of the present invention can be easily fabricated on any conductive layer with a smooth surface, such as a doped silicon substrate, the output metal pads of a finished very large scale integration (VLSI) chip, and a glass wafer with FO coating layer. Thus, it is suitable for silicon-based optical interconnects and low cost optical communication.

The receiver may be composed of a Si photodetector. For example, a metal-semiconductor-metal (MSM) photodetectors (PDs) may be used because of its high frequency response. Alternatively, a Si pin photodiode may instead be used as the receiver, with an expected bandwidth of higher than 30 GHz.

Combining a Si photodetector for visible light with quantum dot modulator of the present invention to compose a transceiver provides a practical solution for optical interconnects. The transmitter is preferably composed of a resonant modulator based on dielectric vertical cavities fabricated at the backend of the Si IC process flow. An off-chip laser may be used as the light source. Optical signal modulation is achieved through changing the bias voltage over a layer situated in the resonant cavity.

The advantages of such a transceiver include easy integration with Si IC resulting in minimum intrusion to conventional Si IC processing, and low "overhead" during electronic-optical signal conversion. Because the transmitter is based on light modulation rather than emission, the chip power consumption is significantly lowered. Furthermore, both the modulator and the detector of the present invention can be fabricated during conventional CMOS backend processing, making it more likely to be accepted by the IC industry, and an ideal low cost optical transceiver that is missing in today's fiber-optic communication infrastructure.

The modulator is preferably fabricated as the extension of the backend process of Si CMOS. The modulator is composed of two quarter-wave stack mirrors composed of alternating dielectric layers (e.g. $SiO_2$ and $TiO_2$), with an optically absorbing layer sandwiched in between to form the vertical resonant cavity. The optically absorbing layer is preferably made of semiconductor (e.g. InAs, CdSe) nanocrystals embedded in a dielectric matrix. The device is configured to operate near the saturation point of the absorption layer. By adjusting the biasing voltage across the absorption layer, the saturation threshold of the semiconductor nanocrystals is altered, resulting in the overall reflectivity of the resonant cavity to vary by over 90% as shown by simulation. The entire structure can be fabricated using RF sputter deposition at substrate temperatures within the allowed limits for Si CMOS backend processing, i.e. lower than 450° C. An off-chip semiconductor laser such as the ones used for DVD players may be used as the CW light source. The optical signal can be transmitted through free-space, or be carried by optical fibers that are vertically coupled to the chips at the packaging stage.

The transceiver of the present invention can also be used for short distance communications such as LANs. The actual distance of such applications will depend on the required data rate, the specific laser wavelength and output power, and the dispersion of the optical fiber.

An aspect of the invention is a modulator for an optical transceiver having a vertical cavity configured to be disposed on an IC. The vertical cavity configured to receive an incident light beam directed at the IC, and to amplify the intensity of the light beam in the vertical cavity. The vertical cavity is further responsive to an electric field generated by voltage bias applied across the vertical cavity to modulate an optical signal reflected by the light beam in response to variation of the electric field.

In one embodiment, the vertical cavity comprises an electro-absorption (EA) layer, wherein the EA layer is configured to at least reach near absorption saturation in response to the incident light beam.

The vertical cavity may also be configured to have a saturation intensity that is a function of the applied electric field generated by the voltage bias, such that the saturation intensity effects an overall reflectivity of the cavity to modulate the optical signal.

In addition, the vertical cavity may be configured to amplify a small change in absorption of the EA layer to a significantly higher contrast in the reflectivity of the modulator.

In one mode, a variation of the electric field results in a change of a saturation threshold of the EA layer, wherein said change in saturation threshold modulates the optical signal.

In another mode, the EA layer is disposed between first and second mirrors, each comprising two quarter-wave stacks of alternating dielectric layers. Generally, the first and second mirrors are amorphous.

In many embodiments, the cavity is disposed between an upper electrode and a lower electrode, such that the voltage bias is applied to the upper and lower electrodes to generate the electric field. In particular, the lower electrode may be a contact configured to be fabricated on the back end of the IC. Overall, the vertical cavity is configured to be fabricated at the backend of the IC process flow In a preferred embodiment, the EA layer comprises semiconductor crystals responsive to the voltage bias to modulate voltage signal. For example, the EA nanolayer may comprise InAs or CdSe nanocrystals dispersed in a dielectric material.

In another preferred embodiment, the EA layer is configured to be brought to a near saturation absorption level with an incident light beam having a wavelength under 1 μm, and in particular substantially within the visible light spectrum.

In another embodiment, the modulator is configured to be one of a 2-D array of modulators disposed on the IC.

Another aspect of the present invention is an optical transceiver for a chip-to-chip interconnect. The optical transceiver comprises a modulator configured to modulate an optical signal from an incident light beam by applying an electrostatic field to vary the saturation intensity of the modulator. The transceiver further comprises a detector coupled to the modulator to receive the modulated optical signal.

Preferably, the modulator and detector are configured to be fabricated directly on Si wafers during back-end processing. In addition, the modulator is configured to modulate the optical signal in the visible light spectrum so that detector may comprise a Si photodetector, or Si photodiode.

In one embodiment of the current aspect, the modulator comprises a vertical cavity having an optically absorptive layer, wherein the vertical cavity is configured such that the optically absorptive layer operates near or at saturation absorption in response to the incident light beam.

In one mode of the current embodiment, the saturation intensity of the optically absorptive layer effects an overall reflectivity of the cavity to modulate the optical signal.

In another embodiment, a light source is coupled external to the modulator to direct the incident light beam at the modulator. The transceiver is configured such that the light source may comprise a generic DVD laser.

In yet another embodiment, the optical transceiver includes a fiber optic cable coupling the light source to the modulator, wherein the fiber optic cable is configured to simultaneously receive the incident light from the light source and the optical signal from the moderator for transmission to the detector.

Another aspect is a method of modulating an optical signal. The method comprise directing an incident light beam into an optical cavity, resonating an optically absorptive element of the optical cavity in response to the incident light beam to generate a high reflectivity optical signal, applying an external electric field to the cavity to alter the resonance of the optically absorptive element, and modulating the optical signal in response to the applied electric field. Preferably, the incident light beam comprises a laser beam in the visible spectrum In one embodiment of the current aspect, resonating an optically absorptive element comprises bringing the absorptive element to at least near absorption saturation, wherein the absorption saturation is a function of the applied electric field.

In addition, the method may further comprise receiving the optical signal with a Si photodetector, or the like.

Another aspect of the invention is a method of fabricating a transmitter on an IC, comprising depositing a first conductive layer on the back end of the IC, depositing a first mirror on the conductive layer, depositing an electro-absorption layer comprising a semiconductor nanocrystal embedded in a dielectric material on the first mirror, depositing a second mirror electro-absorption layer to form a vertical cavity, and depositing a second conductive layer on the vertical cavity.

In one embodiment, depositing an electro-absorption layer comprises co-sputtering semiconductor nanocrystals with the dielectric material in addition, depositing a second conductive layer may comprise sputtering ITO on the vertical cavity.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 3 is a graph of absorption at varying incident light intensity.

FIG. 4a shows saturation vs. wavelength for a Stark effect moderator.

FIG. 4b shows saturation vs. wavelength for the moderator of the present invention.

FIG. 8 illustrates a cross-sectional view of an exemplary Si photodetector in accordance with the present invention.

FIG. 9 is a top view of the Schottky contacts of the photodetector of FIG. 8.

DETAILED DESCRIPTION OF THE INVENTION

Referring more specifically to the drawings, for illustrative purposes the present invention is embodied in the apparatus generally shown in FIG. 1 through FIG. 3 and FIG. 4B through FIG. 10. It will be appreciated that the apparatus may vary as to configuration and as to details of the parts, and that the method may vary as to the specific steps and sequence, without departing from the basic concepts as disclosed herein.

The present invention comprises an optical modulator that is based on electric field control of the saturation absorption threshold of semiconductor quantum dots, Si photodetectors, and an integrated optical transceiver on Si substrates. A vertical resonant cavity is used for boosting the optical power from that of a commercially available semiconductor laser by 50-100 times to the saturation intensity of the quantum dots. The optical modulator of the present invention is based on a completely new operational principles.

The modulator of the present invention is expected to have the advantages of low power consumption and high modulation bandwidth. The Si photodetector can either be in the form of a MSM photoconductor or a photodiode. The use of visible light for the signal enables the use of Si pin diodes. Moreover, the entire fabrication process of the present invention is compatible with Si CMOS backend processing. The transceiver and its components are characterized at both low and high (up to 40 GHz) frequencies.

An EA modulator based on a 1-D photonic band gap (PBG) structure is disclosed for use in an optical transceiver. PBG structures are well suited as modulators because of their ability of tailing the electromagnetic modes inside the structure. Such 1-D PBG structures are also known as the vertical cavities, or vertical cavity surface emitting lasers (VCSELs). A VCSEL can be viewed as a resonant cavity with two mirrors, each being a 1-D PBG, or quarter-wave stack (QWS). An optically absorbing layer inside the multiplayer stacks introduces a resonant mode inside the photonic band gap of the structure, i.e. allowing light within a narrow wavelength range to propagate through the structure. This layer is the controlling part of the modulator. When the optical properties of this layer are changed, the resonant mode will be modified, and so will the propagation and reflection behaviors at that wavelength. In the present invention, an electro-absorption layer as the controlling layer of the modulator.

Figure 1:
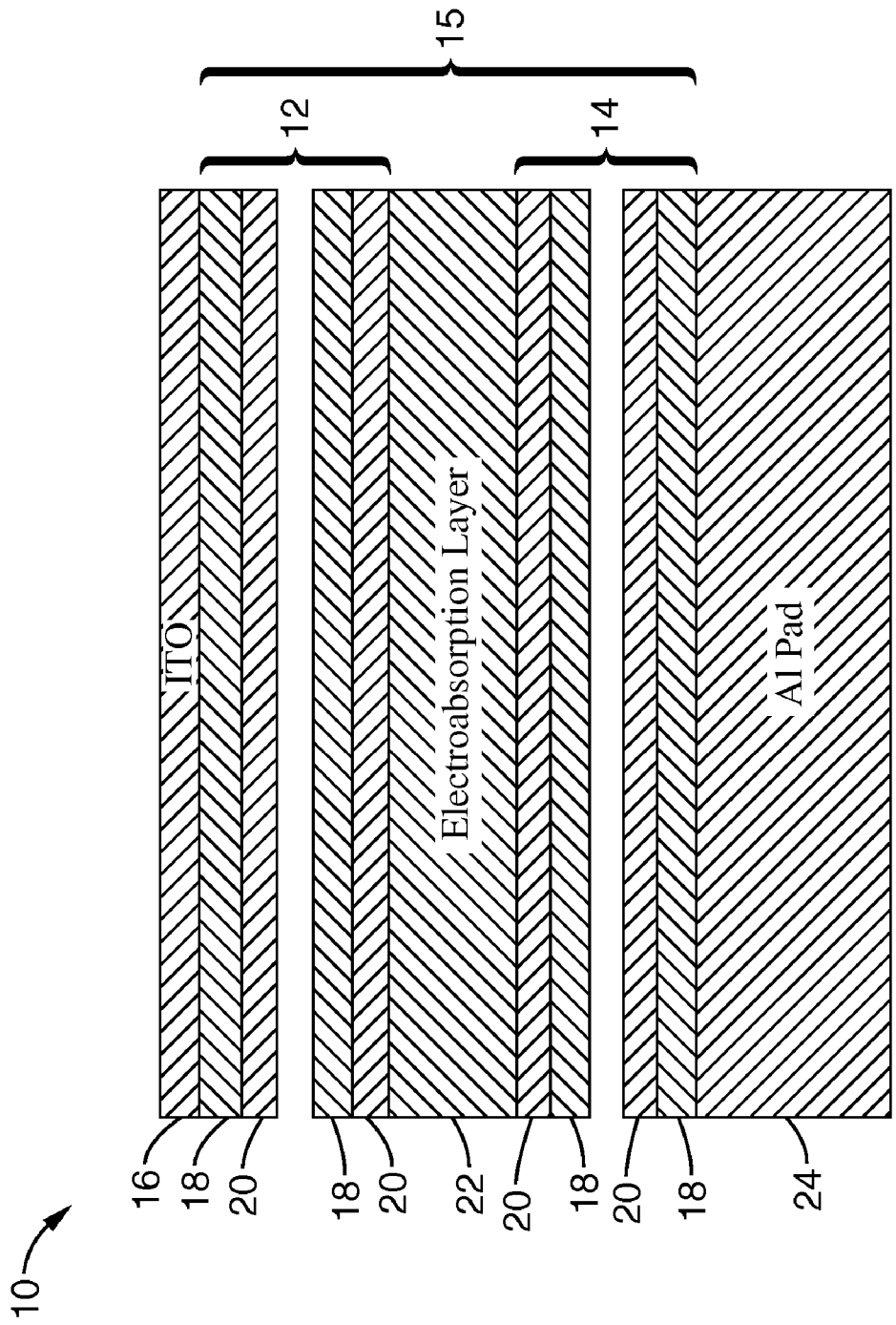
FIG. 1 shows a schematic view of an electro-absorption modulator according to the present invention.

FIG. 1 shows an embodiment of EA modulator 10 according to the present invention. As shown in FIG. 1, the device 10 comprises an upper multilayer stack 12 and lower alternating stack 14 of low and high index of refraction dielectric layers 18 (low index) and 20 (high index). Stacks 12 and 14 are configured to function as mirrors, and in particular quarter-wave stack (QWS) mirrors. An electro-absorption layer (optically absorbing layer) 22 of EA material is sandwiched in between upper and lower stacks 18 and 20 to form a vertical resonant optical cavity 15, with two conductive layers 16, 24, at the top and bottom of the structure functioning as electrodes. The vertical resonant cavity 15 is configured to function generally perpendicular to a substrate or IC surface.

The bottom layer 24 may comprise a conductive substrate or a conductive thin film deposited on a flat surface. Suitable materials for bottom layer 24 include, but are not limited to, an appropriately doped semiconductor, metal, metal silicide or ITO. For example, the entire structure may be fabricated on top of an Al bonding pad 24 that serves as the bottom electrode.

The low and high index dielectric layers 18 and 20 may be any dielectric materials with a refractive index difference larger than approximately 20%. For example, SiO$_2$ (n~1.47) may be used for low index layer 18, and TiO$_2$ (n~2.5) or HfO$_2$, for high index layer 20. Poly-Si may be used for high index layer 20 when the operating wavelength is longer than 1.2 μm.

The thickness t of each layer is preferably selected by the equation:

$$t = \lambda/4n,$$

where n is the refractive index of the layer, and A is the operating wavelength of the modulator 10. Radiofrequency (RF) sputtering may be used for the deposition of these layers.

The EA material used for the electro-absorption layer 22 preferably comprises a crystalline structure, e.g. semiconductor nanostructure or nanocrystal, embedded in a non-crystalline (i.e. amorphous) dielectric material, e.g. $SiO_2$ matrices. The electrical controlled absorption effect of layer 22 is achieved by electrical field modified saturation absorption. To maintain Si CMOS compatibility, the semiconductor nanocrystal (quantum dots) preferably comprises a semiconductor material with absorptive properties having the effect of needing extremely low power, e.g. InAs or CdSe nanocrystals. Other materials may include GaAs, CdTe, CdZnSe, Si, or other similar compounds or elements that have absorption properties in the proper wavelength range (e.g. lower wavelengths such as visible light).

The EA layer 22 may be readily fabricated by RF magnetron co-sputtering of semiconductor and $SiO_2$, e.g. via the process detailed in "Ultraviolet (340-390 nm), Room Temperature, Photoluminescence from InAs Nanocrystals Embedded in $SiO_2$ Matrix", J. Shi, K. Zhu, Q. Zheng, L. Zhang, L. Ye, J. Wu, and J. Zuo, Appl. Phys. Lett. 70, 2586 (1997), incorporated herein be reference in its entirety.

To grow layers of InAs nanocrystals embedded in $SiO_2$ matrices, InAs and $SiO_2$ are co-sputtered at a relatively low temperature range. By controlling the co-sputtering ratio of InAs and $SiO_2$ and substrate temperature, the size of the nanocrystals can be controlled to meet the desired operating wavelength.

The entire structure is generally amorphous except the semiconductor nanocrystals. The nanocrystals form when In and As co-deposited with $SiO_2$ precipitates out from the $SiO_2$ matrix in a self-assembled fashion upon annealing. The temperature for the precipitation process generally takes place below 723 K (450° C.), and particularly at substrate temperature range of from 500 K to 700 K. The low temperature is an important factor for choosing InAs or CdSe nanocrystals instead of Si nanocrystals precipitated out of a sub-stoichiometric SiO. The annealing kinetics, the proportion of InAs (or other nanocrystal material) to $SiO_2$, and other parameters may be controlled to find the optimum condition for producing uniform nanocrystals.

In an alternative embodiment, the EA layer 22 may be fabricated by spin on a thin film of QD containing spin-on glass (SOG). The top mirror of alternating quarter-wavelength thick dielectric films can be deposited on top of the EA layer 22.

The thickness of layer 22 is configured to introduce a resonant mode in the structure, and therefore greatly increase the light intensity in the layer due to the high electromagnetic mode density of the resonant mode. Such high light intensity helps to achieve sufficient saturation absorption, which is needed to get a high modulation depth. Other EA materials may also be used in this layer and benefit from the high light intensity.

The top electrode 16 is generally conductive layer deposited on the total structure, which may be made by iridium-tin oxide (ITO), or other transparent conductive material. The ITO can be grown by electron beam evaporation or sputtering.

The overall dimension of the modulator 10 is significantly smaller than one single bonding-pad, considering the diameter of 8 μm for individual optical fiber and even smaller for free-space coupling. Such a structure can be easily fabricated on a finished silicon VLSI wafer by e-beam evaporation or RF sputtering. Furthermore, the device 10 is inherently compatible with 2-dimensional arrays of transceivers integrated with Si VLSI for dense optical interconnects.

Figure 2:
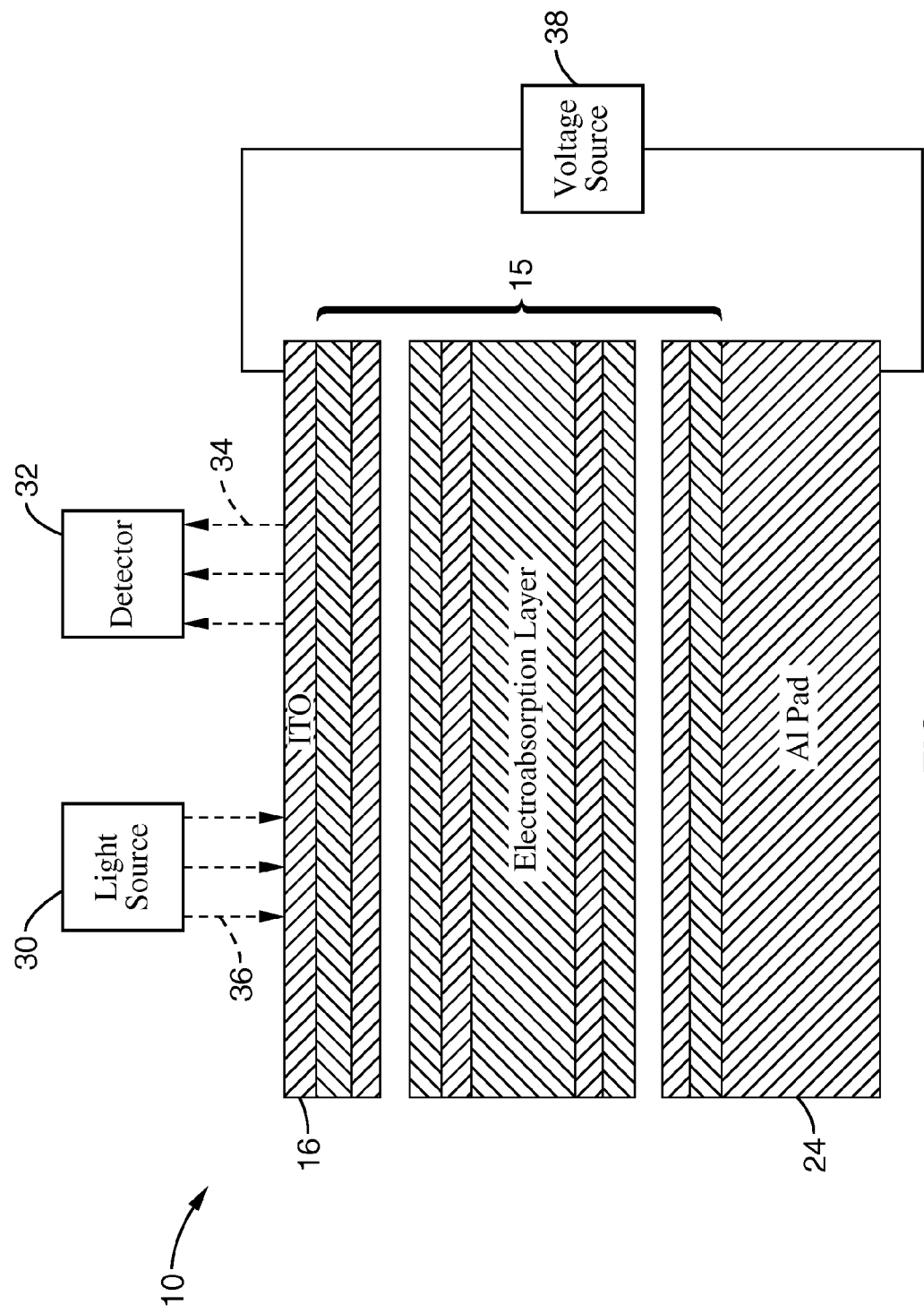
FIG. 2 is a schematic view of the modulator of FIG. 1 in operation with a light source and detector.

FIG. 2 illustrates the modulator 10 in operation with a light source 30 and receiver or detector 32. Modulator 10 acts to amplify the external incident light 36 to generate high light intensity. The modulator 10 is configured such that the nanocrystals of layer 22 operate at near absorption saturation intensity (or higher), in contrast to the Stark effect based approaches that operate within the linear region of the absorption curve.

For purposes of this description, near saturation absorption occurs at the point when an incremental amount of light being absorbed is not linearly proportional to the incident light intensity. FIG. 3 illustrates a graph of incident light intensity against light absorption of the material. In the linear region, any increase in light intensity essentially results in a proportional increase in absorption. However, at near saturation absorption (between $A_n$ and $A_s$) the incremental increase in the amount that is absorbed is less than the incremental increase in the incident light intensity. The ratio of absorption to intensity continues to decrease until saturation occurs ($A_s$), at which point the absorption is fixed (horizontal) with increasing intensity.

FIGS. 4A and 4B further illustrate the working range of the present invention (FIG. 4B) as opposed to Stark effect devices. For the quantum confined Stark effect, the absorption change is introduced by shifting the absorption edge of the quantum well, while in the modulator of the present invention, the absorption change is due to the decrease of saturation intensity of the quantum dots, which are schematically shown in FIGS. 4A and 4B. Since we change the absorption coefficient of quantum dots at wavelength much shorter than the absorption edge, there is no requirement of good size uniformity of quantum dots for an abrupt and clear absorption edge.

When there is no bias applied on the modulator 10, the cavity 15 is configured such that near saturation absorption of incident light 36 takes place at the optically absorptive material 22 due to the high light intensity. The absorption in the cavity 15 weakens the resonant mode and higher reflectance (i.e. amplification of the incident light 36) can be found compared with such a structure without absorption.

When the incident light intensity is near the saturation intensity, the absorption coefficient decreases with increasing excitation intensity. In the meantime, the saturation intensity itself increases with decreasing population relaxation time of photo-excited nanocrystals.

By applying an electrical signal, such as a varying voltage supplied from voltage source 38 (in the case of a transceiver, the signal to be transmitted), to the electrodes 16 and 24, an external electric field is created in the structure. When the electrostatic field is applied on the system, the overlap between the wavefunctions of electrons and holes in the semiconductor nanocrystals is altered (due to the decoupling of electron and hole wavefunction in the nanocrystals), resulting in a change in the recombination rate and therefore the relaxation time (i.e. the population relaxation time in the nanocrystals increases). Therefore, the saturation absorption power of the cavity 15 will decrease, which will result less absorption in the cavity 15. The reflectance is thus reduced. Consequently, the saturation intensity, and therefore the overall reflectivity of the modulator, becomes a function of the applied electrostatic field. Modulation of the reflected optical signal 34 sensed by detector 32 is thus achieved by altering the reflectivity of the modulator 10 (e.g. by varying the voltage across the electrodes).

Note should be taken that the modulator 10 of the present invention operates on electric filed effect rather than current injection. Current does not follow through the cavity, as the EA material 22 acts as an insulator. Only displacement current occurs through the EA material. As a result, the modulator 10 is able to operate under extremely low power consumption.

Figure 10:
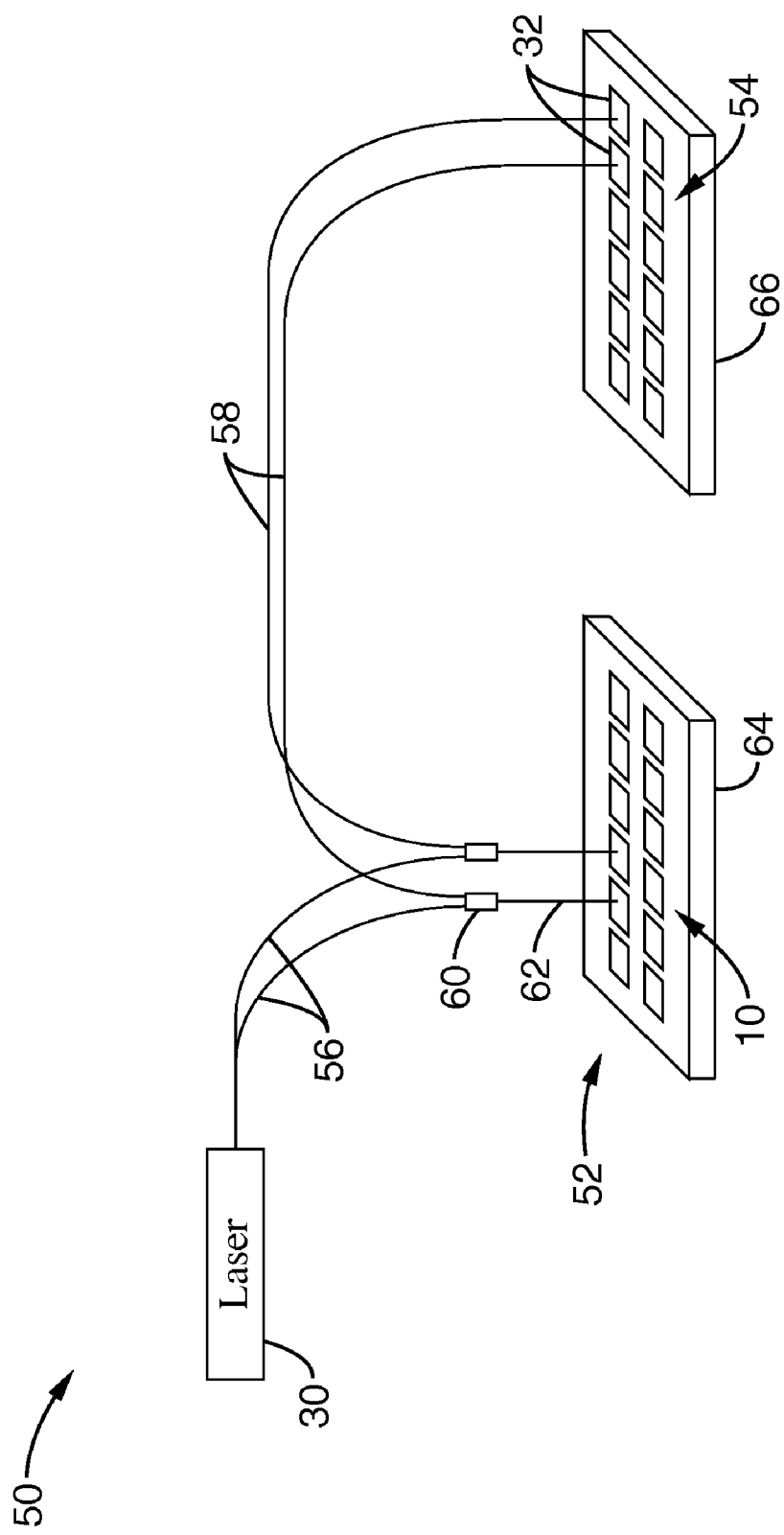
FIG. 10 illustrates a schematic chip-to-chip interconnect of the present invention.

The optical signal 34 can be transmitted through freespace, or be carried by optical fibers that are vertically coupled to the Si chips at the packaging stage (explained in further detail below with respect to FIG. 10).

When other EA materials rather than the embedded semiconductor nanocrystals disclosed above are used, the mechanism of external electrical field controlled absorption may be different, but any electrical controlled absorption change in the cavity 15 will cause the reflectivity of the modulator 10 to change.

Such an electro-absorption effect will require a relatively high incident light intensity ($\sim 10^5$ W/cm$^2$) to ensure that the semiconductor nanocrystals are near their absorption saturation intensity. The saturation intensity of InAs quantum dots embedded in SiO$_2$ has been determined (using Z-scan absorption measurements) to be $10^5$-$10^6$ W/cm$^2$, depending on dot size distribution and dot density.

Figure 5:
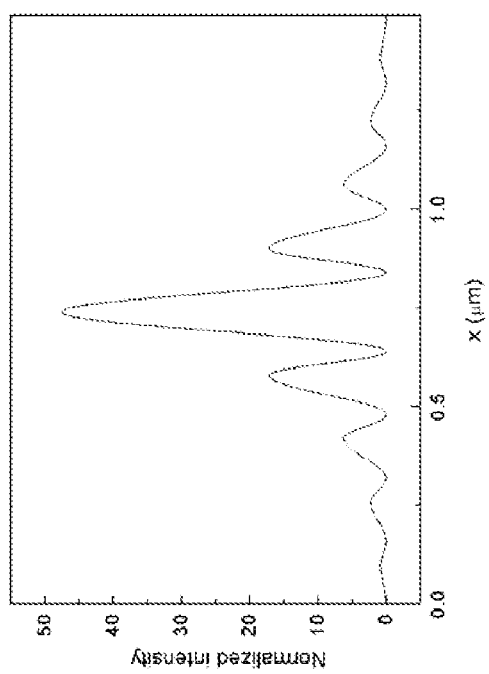
FIG. 5 shows the simulated performance for the modulator of the present invention.

The electro-absorptive materials as used in the device of the present invention can be brought to near the saturation excitation level with an ordinary laser. FIG. 5 shows the expected performance for an embodiment of the modulator 10 of the present invention. FIG. 5 shows a factor of 50 enhancement of light intensity at the resonance location inside the cavity.

Consequently, the saturation intensity requirement can be met using a commercially available laser diode ($\sim 2 \times 10^4$ W/cm$^{-2}$) emitting at the resonance wavelength.

One consideration in the design of a device 10 of the present invention is the desired finesse, i.e. how precise is the thickness of each of the layers. With the state-of-the-art thin film deposition technology such as sputtering, film thickness control on the order of percents is achievable, and thus a tolerance value of 1% may be practically achieved for fabrication of the vertical cavity.

There are design trade-offs concerning the finesse of the QWS device of the present invention. Increasing the finesse leads to the increase of the value of the resonance peak shown in FIG. 6 and the associated narrowing of the peak. Additional layers of QWS (e.g. stacks 12 and 14) may be used to increase the Q of the cavity, and thus allow for the operation of the modulator 10 using a weaker laser or light source 30. However, such a design also creates a more difficult fabrication task of matching the frequencies of the resonant mode with that of the laser 30.

This can be further evaluated by examination of the available lasers for light source 30, and in particular, commercially available DVD lasers. Typical output power of a DVD laser is on the order of 1 mW. For DVD application, the far-field spot size can be estimated from the pixel size of a DVD disc. For a 5-inch disc that stores 2 Gb of information, the pixel size can be estimated at approximately $6 \times 10^{-8}$ cm$^2$, or 2.5 µm×2.5 µm. This gives a power density of 1 mW/$6 \times 10^{-8}$ cm$^2$ $\sim 2 \times 10^4$ W/cm$^2$. This value may be further reduced by a factor of 10 to account for beam size broadening (due to various factors both from inside the vertical cavity, as well as from the potentially longer distance light has to travel). Thus, the multiplication factor of the vertical cavity can be estimated to be from 50 to 500, depending on the semiconductor quantum dot size uniformity. This value falls within the range permitted by QWSs with 4 periods on each side with 1% film thickness variation.

Figure 6:
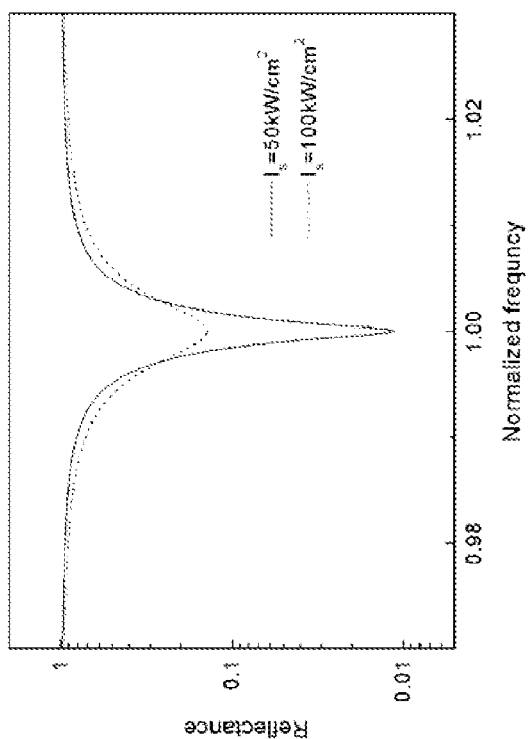
FIG. 6 illustrates simulated reflection spectra at varying saturation intensities of 50 kW/cm$^3$ and 100 kW/cm$^3$ FIG. 7 which shows the calculated optical field intensity inside the vertical cavity of the present invention in response to an incident optical pulse of 1.67 ps pulse width.

FIG. 6 illustrates simulated reflection spectra at varying saturation intensities of 50 kW/cm$^3$ and 100 kW/cm$^3$. Eight periods were used to simulate a low finesse configuration. With the electric field controlled absorption shown above, modulation depth higher than 90% can be achieved with a loss lower than 7 dB.

The above estimated results shown in FIG. 6 are based on conservative numbers, yet there is no fundamental reason for the thickness control not being better than 1%. In addition, the lower number of stacks 12, 14 has the benefit of shorter field build-up time, as shown in FIG. 6. The above exercise serves as a feasibility test for the proposed research and indicates that the proposed modulator can indeed be achieved.

High quality QWS's have been demonstrated in both semiconductor vertical cavities as well as dielectric cavities. Because of the ability to use shorter wavelengths under the configuration of the present invention, the control of absolute film thickness during deposition is relaxed.

To calculate the reflective spectrum of the structure, a modified transfer matrix method is used. A decay propagation matrix of light propagation within one layer is introduced to include the absorption in the structure, which is represented by $$T = \begin{bmatrix} \cos(kd)\cosh(\alpha d) - i\sin(kd)\sinh(\alpha d) & -\sin(kd)\cosh(\alpha d) - i\cos(kd)\sinh(\alpha d) \\ \sin(kd)\cosh(\alpha d) + i\cos(kd)\sinh(\alpha d) & \cos(kd)\cosh(\alpha d) - i\sin(kd)\sinh(\alpha d) \end{bmatrix},$$

where k is the wave vector of light, $\alpha$ is the absorption coefficient, and d is the thickness of this layer. Using this propagation matrix in standard transfer-matrix method, the transmission and reflection of light in a system with absorption can be calculated. FIG. 6 shows the calculation results of reflective spectra of the modulator structure 10. A modulation depth higher than 10:1 can be achieved with a loss lower than 9 dB using an electrostatic field. Such modulation depth is comparable to conventional modulators based on LiNbO.

Modulation depth, or extinction ratio, in a transmitter may impact the bit-error-rate (BER) in data communication. For a single channel, point-to-point case, BER obeys the following equation:

$$BER = 0.5 \cdot \text{erfc}(0.7Q)$$

where $$Q = \frac{I(\text{on}) - I(\text{off})}{N(\text{on}) - N(\text{off})}$$

As is evident, a lower extinction ratio can be compensated with increasing signal power within certain limits. With the present invention, the expected 10:1 extinction ratio is comparable to that of common communication lasers and should be sufficient for the intended applications.

A rough estimation of the necessary driving current was also simulated. For a device area of 10 µm×10 µm (for single mode fiber or free-space coupling), the device capacitance is estimated to be C~1 fF, based on the known dielectric constants of $TiO_2$ and $SiO_2$ and for a (vacuum) wavelength of 635 nm. For a bias voltage of 2V (that equals to an electric field of 1 MV/m), the driving current needed is ~0.1 mA, and driving power is about 0.2 mW at 10 GHz working frequency. This level of driving current can be provided by a NMOSFET of about 2 μm gate width. Therefore, no special driver circuits with large current drive capability are necessary for operation of the present invention.

Another potential physical limitation to the maximum operating frequency of the modulator 10 of the present invention is the time it takes for the building up of the optical field inside the vertical cavity. This can be estimated by solving the time-dependent Maxwell's equation inside the cavity. FIG. 7, which shows the calculated optical field intensity inside the vertical cavity in response to an incident optical pulse of 1.67 ps pulse width. The time delay was approximately 0.07 ps, and the broadening of the pulse shape is negligible.

It can be seen that the optical field build-up time allows for modulation frequencies significantly higher than 100 GHz. Optical interconnects are not subject to the same set of physical limits that keep electrical interconnects to be below 10 GHz. The above calculation shows that the modulator 10, which addresses the critical issue of efficient conversion of electrical signal to optical signal, offers a realistic solution for chip-to-chip interconnect that can go far beyond 2016 according to the ITRS projection.

There are clear distinctions between the modulator of the present invention and conventional electro-optical modulators, including those based on LiNbO, SrBaNbO, and polymeric materials. For LiNbO and SrBaNbO modulators, there is an inherent trade-off between the modulator length (L) and the applied voltage for 180-phase shift ($V_\pi$). Typical value of $V_\pi L$ ranges from a few volts-cm to 0.25 V-cm with a modulation depth of 95%-99%. As a result, the modulators require either a waveguided structure of centimeter length, or a modulation voltage much higher than the typical supply voltage on-chip. The waveguide geometry of centimeter lengths makes them incompatible with dense 2-dimensional modulator arrays as may be required by future Si technology.

Most of these features are also applicable to polymer modulators. The weak electro-optical coefficient of the currently known polymer materials leads to a much higher $V_\pi \cdot L$ value. Another issue with conventional modulators is the need for high voltage poling after the film is deposited (typically by sputtering) onto the substrate. Such high voltage process may subject the underlying Si circuit to electrostatic damage. As shown above, the proposed device does not have the aforementioned drawbacks. It is predicted to provide 90% modulation depth with a low voltage and at high speed. Furthermore, because of the low capacitance, the device of the present invention can be driven with a single NMOSFET.

The requirements of the detector 32 for the device of the present invention are somewhat different from that of typical detectors for optical fiber communication. Since the loss in a fiber of several meters in length is negligible, the intensity of the optical signal that reaches the detector 32 (~0.1 mW) is much higher than that in long distance communication. As a result, high responsivity is not a primary concern for the device of the present invention. Instead, the detector bandwidth is a much more important factor. Thus, the device may operate under visible light, enables use of Si photodetectors. Since we are only concerned with high bandwidth communication over short distances, the shortcomings of visible light can be ignored.

FIG. 8 illustrates an exemplary cross-section of the structure for a detector of the present invention using a metal-semiconductor-metal (MSM) photodetector (PD) 40. MSM PD's have the characteristics of high frequency response (more than 100 GHz) and low responsivity, and thus are a preferred choice for chip-to-chip optical interconnect applications. The photodetector 10 has two metallic electrodes 44, 46 (i.e. Schottky contacts) disposed on a semiconductor material, e.g. Si substrate 42. FIG. 9 illustrates a top view of the interlacing fingers of electrodes 44 and 46 Light absorbed in the semiconductor generates electrical carriers (electrons and holes), which are collected by the electric field associated with a voltage applied to the electrodes, and thus contribute to a photocurrent.

An amorphous silicon layer 41 (A-Si.H) is preferably used to increase the Schottky barrier height in order to reduce dark current. Amorphous silicon may be deposited on the Si substrate 42 by plasma enhanced chemical-vapor deposition (PECVD) at about 200° C. The electrodes 44, 46 generally comprise a Cr layer 48 disposed on the amorphous layer 41. The Cr layer 48 may be deposited by sputtering and patterned with a lift-off technique. The detector 32 may be fabricated during or after the back-end processing of conventional CMOS. In either case, it fabrication of detector 40 is compatible with standard Si CMOS processing.

To estimate the anticipated performance of the MSM PD 40, the typical values of external quantum efficiency of about 1%, and total noise current of 0.1 nA (1 $pA/m^2$ for a 10 μm×10 μm device) were used. An input signal power of 0.1 μW is needed to achieve a BER of $10^{-11}$. Take the pumping power of the modulator as 1 mW the overall coupling loss as 10 dB, and the loss caused by the modulator as 9 dB, 10 μW was obtained as the power reaching the detector. This is 100 times the required power for achieving BER less than $10^{-11}$. Based on these calculations, the proposed modulator 10 and detector 40 can work together as a transceiver with very low BER at >10 GHz.

In an alternative embodiment, detector 32 may comprise a Si photodiode (e.g. pin junction diode) instead of photodetector 40. The photodiode can be built into the chip during front end processing. It is well known that the detectivity of Si photodiodes peak at around a wavelength of 600 nm. Since the modulator 10 of the present invention is configured to operate under short wavelengths (e.g. 635 nm DVD laser, Si photodiodes are an available option.

There is an intrinsic trade-off between the bandwidth and the responsivity. The absorption depth at that wavelength range in Si is on the order of 1 μm. As a result, there is no need for the width of the i-region to be more than 1 mm. The corresponding drift velocities of electron and holes under a 2 volts bias in Si are $1\times10^7$ cm/s and $3\times10^6$ cm/s, respectively. The transit time is limited by holes and is approximately 33 ps, corresponding to a bandwidth of 30 GHz. Because of the small area needed for the detector, the transit time delay is dominating over the RC delay. Further reduction in the depletion width down to 0.2 μm leads to approximate doubling of the bandwidth, mainly due to the increase in the drift velocity of holes. Of course, the gain in the frequency response will be at the expense of reduced responsivity. Despite of the intrinsic trade-off, Si pin photodiodes are expected to allow transceiver operation of higher than 30 GHz per channel with 2D array capability, significantly out perform any electrical chip-to-chip interconnect.

Packaging is often the most expensive step in the cost of a chip, especially when it involves alignment between optical elements such as with input-output fibers. Due to advancements in optical packaging, technology is available for practical packaging of Si chips with chip-to-chip optical interconnects. Furthermore, such packaging technology does not require costly active or visual alignment. One such technology is currently being used in production by NEC Corporation for VCSEL-based optical functional devices, as described in H. Kosaka, IEEE J. Selected Topics in Quantum Electron., 5, 184 (1999), incorporated herein by reference in its entirety.

Precision-etched V-holes in Si chips are used as alignment guides between the Si chips and the package and again between the VCSEL and Si chips. Planes in a Si crystal have the highest packing density and are therefore most resistant to chemical etching. This anisotropic etching behavior is most significant when carried out in a known group of anisotropic etchants including KOH and EDP. The results of such anisotropic etching are V-grooves bounded by facets. When the top opening of these V-grooves may be reduced from rectangle to square to produce V-holes. The position of the V-holes can be aligned on the chip to the same level of submicron precision.

In VCSEL packages, a precision-machined alignment tool is used to align the Si chips relative to the package using the V-holes and guide holes on the package. This way, Si chips are placed in the package in an exact way. The V-holes are also used for the alignment of VCSEL chips relative to the Si chip. The guide holes on the package are then used to guide the optical fibers to the correct location. This technology results in an average coupling loss of 0.67 dB with a standard deviation of 0.15 dB. The average optical cross-talk between neighboring channels is −65 dB.

Packaging for the current invention may be performed in a similar manner. FIG. 10 illustrates a schematic chip-to-chip interconnect or optical transceiver 50 that is composed of a optical modulator 10 and a Si photodetector 32 that is capable in operating under visible light and can be fabricated onto Si wafers during the backend CMOS processing. The interconnect 50 comprises a modulator array 52 of individual modulators 10 that are disposed on Si chip 64. The interconnect 50 further comprises a detector array 54 of individual detectors 32 that are disposed on Si chip 66. Each of the individual modulators is optically coupled to a corresponding detector 32 on the detector array 64 via a fiber optic link 58. The incident CW light is directed from the light source or laser 30 onto the modulator 10 via from optical link 56. A fiber optic circulator or coupler 60 may be used to channel both the incident CW light from line 56 and the reflected (modulated) light from the modulator 10 (that is directed out to link 58) via a single line 62.

Compared to the NEC VCSEL arrays, the packaging requirement for the modulator of the present invention is more forgiving for a variety of reasons. First, the modulators 10 and Si photodetectors 30 are fabricated directly on the Si chips 64, 66. Hence, there is no need for alignment between the optical devices and the Si chip as in the case of VCSEL chip on Si. Second, since the same optical fiber (62) is used for the incident CW light and the reflected (modulated) light onto and from the modulator 10, it is essentially "self-aligned". This second feature greatly relaxes the need for aligning the fiber with the lateral mode of a laser 30, making it much easier to achieve low coupling loss.

In summary, there are proven technologies for practical packaging of 2-D array of optical elements with optical fibers all the optical transceiver of the present invention to be incorporated into products without having to advance new packaging technology.

In conclusion, the present invention provides an innovative process of modulation of reflected light by controlling the saturation absorption intensity of extremely low power semiconductor quantum dots. The use of a vertical cavity to convert the output power density of an ordinary semiconductor laser to the required level that can cause absorption saturation of the semiconductor quantum dots is novel breakthrough in optical chip-to-chip interconnects. The combined features promise a low power, economical, high bit rate optical modulator that for use as a transmitter in chip-to-chip optical interconnects.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A modulator for an optical transceiver, comprising:
a resonant vertical cavity configured to be disposed on an IC;
the vertical cavity comprising an electro-absorption (EA) layer, and first and second mirrors between which the EA layer is disposed;
the vertical cavity configured to receive an incident light beam directed at the IC;
the vertical cavity configured to amplify the intensity of the light beam in the vertical cavity;
wherein the EA layer is selected to at least reach near absorption saturation in response to the incident light beam;
wherein the vertical cavity is further responsive to an electric field generated by voltage bias applied across the vertical cavity, the EA layer having a saturation intensity that is a function of the applied electric field generated by the voltage bias; and
wherein the vertical cavity is further configured to modulate an optical signal reflected by the cavity in response to variation of the electric field by changes in reflectivity of the cavity caused by changes in saturation intensity of the EA layer.

2. A modulator as recited in claim 1:
wherein the vertical cavity is configured to amplify a small change in absorption of the EA layer to a significantly higher contrast in the reflectivity of the modulator.

3. A modulator as recited in claim 1:
wherein a variation of the electric field results in a change of a saturation threshold of the EA layer;
wherein said change in saturation threshold modulates the optical signal.

4. A modulator as recited in claim 1:
  wherein the first and second mirrors each comprise quarter-wave stacks of alternating dielectric layers.

5. A modulator as recited in claim 4, wherein the first and second mirrors are amorphous.

6. A modulator as recited in claim 5, wherein the lower electrode comprises a contact configured to be fabricated on the back end of the IC.

7. A modulator as recited in claim 1:
  wherein the cavity is disposed between an upper electrode and a lower electrode;
  wherein the voltage bias is applied to the upper and lower electrodes to generate the electric field.

8. A modulator as recited in claim 1:
  wherein the EA layer comprises semiconductor nanocrystals responsive to said voltage bias to modulate the optical signal.

9. A modulator as recited in claim 8, wherein the EA layer comprises InAs or CdSe nanocrystals dispersed in a dielectric material.

10. A modulator as recited in claim 1, wherein the EA layer is configured to be brought to a near saturation absorption level with an incident light beam having a wavelength under 1 μm.

11. A modulator as recited in claim 10, wherein the EA layer is configured to be brought to a near saturation absorption level with an incident light beam having a wavelength substantially in the visible light spectrum.

12. A modulator as recited in claim 1, wherein the modulator is configured to be one of a 2-D array of modulators disposed on the IC.

13. A modulator as recited in claim 5, wherein the vertical cavity is configured to be fabricated at the backend of the IC process flow.

14. A modulator as recited in claim 1 wherein the modulator is formed on a silicon IC.

15. An optical transceiver for a chip-to-chip interconnect, comprising:
  a modulator configured to modulate an optical signal from an incident light beam;
  said modulator configured to modulate the optical signal by applying an electrostatic field to vary the saturation intensity of the modulator; and
  a detector coupled to the modulator to receive the modulated optical signal.

16. An optical transceiver as recited in claim 15, wherein the modulator and detector are configured to be fabricated directly on Si wafers during back-end processing.

17. An optical transceiver as recited in claim 15, wherein the modulator is configured to modulate the optical signal in the visible light spectrum.

18. An optical transceiver as recited in claim 15, wherein the detector comprises a Si photodetector or a Si photodiode.

19. An optical transceiver as recited in claim 15:
  wherein the modulator comprises a vertical cavity having an optically absorptive layer; and
  wherein the vertical cavity is configured such that the optically absorptive layer operates near or at saturation absorption in response to the incident light beam.

20. An optical transceiver as recited in claim 19, wherein the saturation intensity of the optically absorptive layer effects an overall reflectivity of the cavity to modulate the optical signal.

21. An optical transceiver as recited in claim 15, further comprising:
  a light source coupled external to the modulator;
  the light source configured to direct the incident light beam at the modulator.

22. An optical transceiver as recited in claim 21, wherein the light source comprises a DVD laser.

23. An optical transceiver as recited in claim 21, wherein the light source generates an incident light beam having a wavelength in the visible light range.

24. An optical transceiver as recited in claim 21, further comprising:
  a fiber optic cable coupling the light source to the modulator;
  wherein the fiber optic cable is configured to simultaneously receive the incident light from the light source and the optical signal from the moderator for transmission to the detector.

25. An optical transceiver as recited in claim 15 wherein the modulator comprises semiconductor nanocrystals dispersed in a dielectric material.

26. A method of modulating an optical signal, comprising:
  directing an incident light beam into an optical cavity;
  resonating an optically absorptive element of the optical cavity in response to the incident light beam by bringing the absorptive element to at least near absorption saturation to generate a high reflectivity optical signal;
  applying an electric field to the cavity to alter the resonance of the optically absorptive element, wherein the absorption saturation of the absorptive element is a function of the applied electric field; and
  modulating the optical signal as a result of the applied electric field.

27. A method as recited in claim 26, wherein applying an electric field to the cavity comprises applying a voltage bias across the vertical cavity.

28. A method as recited in claim 26, wherein directing an incident light beam into an optical cavity comprises directing a laser beam in the visible spectrum at the cavity.

29. A method as recited in claim 28, further comprising:
  receiving the optical signal with a Si photodetector.

30. A method as recited in claim 26 wherein the absorptive element comprises semiconductor nanocrystals dispersed in a dielectric material.

31. A method of fabricating a transmitter on an IC, comprising:
  depositing a first conductive layer on the back end of the IC;
  depositing a first mirror on the conductive layer;
  depositing an electro-absorption layer on the first mirror;
  wherein the electro-absorption layer comprises semiconductor nanocrystals embedded in a dielectric material;
  depositing a second mirror electro-absorption layer to form a vertical cavity; and
  depositing a second conductive layer on the vertical cavity.

32. A method as recited in claim 31, wherein depositing an electro-absorption layer comprises co-sputtering semiconductor nanocrystals with the dielectric material.

33. A method as recited in claim 31, wherein depositing a second conductive layer comprises sputtering ITO on the vertical cavity.

34. A method as recited in claim 31, wherein the transmitter is formed on a silicon IC.

* * * * *